US005943908A

United States Patent [19]
Innes et al.

[11] Patent Number: 5,943,908
[45] Date of Patent: Aug. 31, 1999

[54] PROBE FOR SENSING FLUID LEVEL

[75] Inventors: Sean C. Innes, Sarasota; James S. Leonard, Parrish; Albert A. Reinhart; James R. Champion, both of Sarasota, all of Fla.

[73] Assignee: Teleflex Incorporated, Plymouth Meeting, Pa.

[21] Appl. No.: 08/925,571

[22] Filed: Sep. 8, 1997

[51] Int. Cl.⁶ .................................................. G01F 23/284
[52] U.S. Cl. .................. 73/290 R; 73/290 V; 73/304 C; 324/632; 324/643
[58] Field of Search .............................. 73/290 V, 290 R, 73/304 R, 304 C; 367/908; 324/632, 637, 643, 644

[56] References Cited

U.S. PATENT DOCUMENTS

| | | | |
|---|---|---|---|
| 3,735,638 | 5/1973 | Miller | 73/304 R |
| 3,812,422 | 5/1974 | De Carolis | 73/304 R |
| 3,832,900 | 9/1974 | Ross | 73/290 R |
| 3,874,237 | 4/1975 | Zwartz | 73/290 R |
| 3,995,212 | 11/1976 | Ross | 73/290 R X |
| 4,170,135 | 10/1979 | Booman et al. | 73/290 R |
| 4,359,902 | 11/1982 | Lawless | 73/290 R |
| 4,891,980 | 1/1990 | Kawai et al. | 73/290 R |
| 5,457,394 | 10/1995 | McEwan | 324/642 |
| 5,651,286 | 7/1997 | Champion et al. | 73/290 V |
| 5,701,932 | 12/1997 | Bourscheid et al. | 73/304 C X |

FOREIGN PATENT DOCUMENTS

| | | | |
|---|---|---|---|
| 2548361 | 1/1985 | France | 73/304 C |
| 8403350 | 6/1986 | Netherlands | 73/304 C |
| 1638558 | 3/1991 | U.S.S.R. | 73/290 R |

Primary Examiner—Richard Chilcot
Assistant Examiner—Willie Morris Worth
Attorney, Agent, or Firm—Howard & Howard

[57] ABSTRACT

An apparatus (50, 100, 150) for sensing a surface level (20) of fluid (12) includes a generally cylindrical central conductor (16, 102, 152) for connection to a pulse signal source (26) with a reduced diameter end (28, 104, 154) and an opposite end (24, 124, 168); a generally tubular outer conductor (14) concentric with the central conductor for connection to the pulse signal source and having one open end (32) adjacent the central conductor reduced diameter end and an opposite open end (18) adjacent the central conductor opposite end, the central conductor and the outer conductor forming a transmission line for pulse signals generated by the pulse signal source and a cavity (C) between an interior wall surface of the outer conductor and an exterior surface of the central conductor; a non-metallic seal (54) mounted at the outer conductor open end for sealing the cavity, the central conductor reduced diameter end extending through a central aperture (52) formed in the seal; a circuit board (58) for mounting the pulse signal source and being electrically connected to the central conductor reduced diameter end and to the outer conductor one open end; and either a socket (68) attached to the outer conductor one open end or a collar (112) attached to the circuit board for maintaining the seal in sealing contact with the outer conductor one open end and the central conductor reduced diameter end to prevent the fluid in the cavity from contacting the circuit board.

18 Claims, 8 Drawing Sheets

PROBE FOR SENSING FLUID LEVEL

TECHNICAL FIELD

The subject invention relates to a probe apparatus for sensing fluid levels in a closed tank.

BACKGROUND OF THE INVENTION

Various mechanical, electromechanical and sonic techniques have been employed to measure the level of liquid in a container or the interface levels between two or more liquids. The mechanical and electromnechanical systems are relatively slow in reacting to changes in the level of the liquid, while systems employing sonic or ultrasonic transmissions become complex when used to measure the surface levels of contained liquids because of the echoes received from the surfaces forming the sides of the container.

Most prior art radiation reflection detection systems, while providing highly accurate indications of liquid level and responding in extremely short times to changes in the levels of the contained liquids, require very complex and expensive apparatus in order to function properly. One prior art system which attempts to minimize this complexity is shown in the U.S. Pat. No. 3,832,900. This system utilizes an open coaxial line which is immersed in the contained liquid, the contained liquid thereby filling the coaxial line. The liquid surface creates a discontinuity in the coaxial line which produces a reflection of the base band pulse signal that propagates back along the transmission line. The time at which this reflection is received, relative to the time of the transmitted pulse, determines the level of the liquid. However, the transmission line tends to clog and requires frequent cleaning.

Another apparatus for measuring the level and dielectric constant of liquid is shown in the U.S. Pat. No. 3,995,212. This device generates a subnanosecond base band pulse-that propagates through a transition device to a single wire transmission line that extends through an air filled region into the liquid. The discontinuity created at the air-liquid interface produces a reflection of the base band pulse that is compared with the transmitted pulse with respect to time of arrival and amplitude to determine the liquid level and the reflection coefficient at the air liquid interface. The reflection coefficient is then utilized to determine the dielectric constant of the liquid.

Another fluid level sensor is shown in the U.S. Pat. No. 5,457,990 wherein a fuel level sensor includes a coaxial conductor probe that is positioned within a fuel tank at an angle relative to vertical and horizontal references. A repetitive electrical signal having a train of transients is transmitted from the upper end of the line and the line is monitored for reflections exceeding a threshold to generate an analysis window during which time the received reflected signals are analyzed to determine the level of the liquid in the tank.

The U.S. Pat. No. 3,812,422 discloses another time domain reflectometry fuel measuring device. This fuel measuring device requires a coaxial arrangement that has a grounding device between the inner and outer conductors. The grounding device is preferably in the form of a metallic plug at the bottom of the probe between the two conductors without which accurate measurements cannot be acquired.

A micropower impulse radar studfinder device utilizing time domain reflectometry is shown in the U.S. Pat. No. 5,457,394. Unmodulated pulses, approximately 200 ps wide, are emitted from a generator positioned on the surface of a wall. A large number of reflected pulses are sampled and averaged while background reflections are subtracted. Reflections from wall studs or other hidden objects are detected and displayed using light emitting diodes.

A microwave device for measuring the level of liquid in a container is shown in the U.S. Pat. No. 4,359,902. A "magic tee" has an "H" arm connected to a microwave sweep oscillator generating a sweeping frequency microwave signal, a first collinear arm connected to a termination, a second collinear arm connected to a waveguide inserted into a container of liquid and an "E" arm connected to an "RF" input of a mixer. A "LO" input of the mixer is connected through a coupler to the oscillator output and an "IF" output of the mixer is connected to a detector for sensing a frequency difference between a reflected signal and another output signal of the oscillator.

SUMMARY OF THE INVENTION AND ADVANTAGES

The present invention concerns an apparatus for use in sensing fluid levels and includes a generally cylindrical central conductor adapted to be connected to a pulse signal source and having a reduced diameter end and an opposite end and a generally tubular outer conductor concentric with the central conductor and adapted to be connected to the pulse signal source, the outer conductor having one open end adjacent the central conductor reduced diameter end and an opposite open end adjacent the central conductor opposite end, the central conductor and the outer conductor forming a transmission line for pulse signals generated by the pulse signal source and a cavity between an interior wall surface of the outer conductor and an exterior surface of the central conductor for receiving fluid. The apparatus further includes: a non-metallic sealing means mounted at the one open end of the outer conductor for sealing the cavity, the central conductor reduced diameter end extending through a central aperture formed in the sealing means; a circuit board adapted to mount the pulse signal source and being electrically connected to the central conductor reduced diameter end and to the outer conductor one open end; and a seal retaining means attached to one of the outer conductor one open end and the circuit board for maintaining the sealing means in sealing contact with the outer conductor one open end and the central conductor reduced diameter end to prevent fluid in the cavity from contacting the circuit board.

It is an object of the present invention to directly connect a ground plane and signal path on a circuit board to a transmission line while maintaining correct impedance matching from the board to the transmission line in a fluid probe.

It is another object of the present invention to reduce the cost of a fluid probe by eliminating an RF connector between a circuit board and a transmission line.

It is a further object of the present invention to seal a circuit board from a fluid in a dielectric cavity of a transmission line while maintaining correct impedance matching from the board to the transmission line in a fluid probe.

BRIEF DESCRIPTION OF THE DRAWINGS

Other advantages of the present invention will be readily appreciated as the same becomes better understood by reference to the following detailed description when considered in connection with the accompanying drawings wherein.

3

DETAILED DESCRIPTION OF THE PREFERRED EMBODIMENT

The present invention concerns the use of time domain reflectometry (TDR) to measure fluid levels in a closed tank. Time domain reflectometry measures the pulse-echo interval of a short electrical pulse propagating from a pulse source along a conductor to a break and back to the pulse source where a pulse receiver is located. The measured interval "T" between generation and reception is scaled by the speed of light "C" and the square root of the relative dielectrical constant "$\epsilon_r$," of the material surrounding the conductor to determnine the distance "D" to the break, or D =$(\epsilon_r)^5$CT. The conductor can be an electrical transmission line that is inserted into fluids and the gas/liquid or liquid/liquid boundary becomes the "break" or discontinuity that reflects the pulse. The time difference between a pulse generated and a reflection received at the start of the line from the boundary can be used to determine the distance along the line and consequently the fluid level which creates the boundary. When the line is inserted into a liquid, the strength of the reflected pulses scale with the dielectric constants at the gas/liquid boundary in subsurface liquid/liquid boundaries. When the liquid has a low relative dielectric constant, such as JP-3 jet fuel ($\epsilon_r$=2.08), only a portion of the pulse is reflected at the gas/liquid boundary and the remaining portion continues into the liquid until another discontinuity is reached, such as an oil/water boundary ($\epsilon_r$=79 for water), or the tank bottom itself ($\epsilon_r$=∞ for metal). Thus, the line can measure fuel fill level while providing additional information about conditions within the tank.

The pulses traveling down the line are reflected at the precise gas/liquid or liquid/liquid boundary regardless of the dielectric constants involved. The dielectric constants affect the amplitude of the reflected pulses, but not their position and time. Pulse amplitude variations may introduce measurement errors, but these errors can be trimmed out in the associated electronics since the dielectric constant of the liquid in a tank is generally known.

Figure 1:
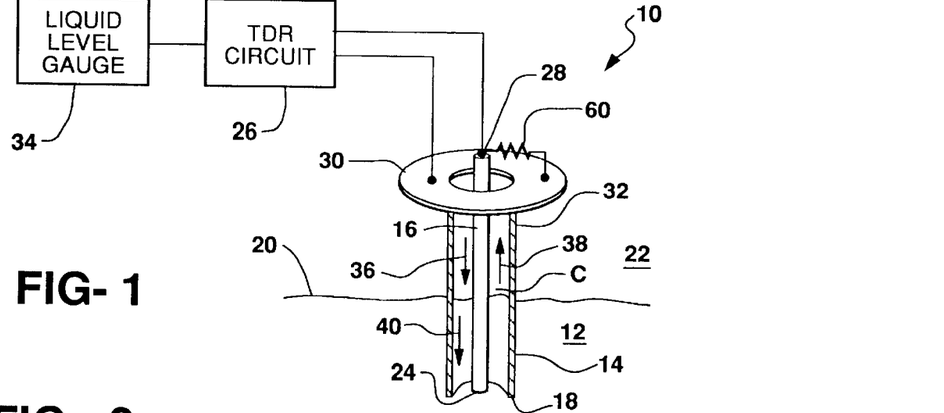
FIG. 1 is schematic diagram of a fluid level sensing apparatus including a probe assembly in accordance with the present invention.

There is shown in the FIG. 1 a fluid level sensing assembly 10 for measuring a level of liquid 12 inside a tank (not shown). The assembly 10 includes an outer conductor formed as a hollow tube 14 coaxially surrounding a central conductor 16. An open lower end 18 of the tube 14 extends

4 below a surface level 20 of the liquid 12 which level defines a boundary between the liquid and a gas 22, such as air, filling an upper portion of the tank (not shown). The central conductor 16 also has a lower end 24 which terminates adjacent the lower end 18 of the tube 14. The conductors 14 and 16 form a transmission line for sensing a level of the fluid 12 in a cavity C defined as the space between the interior wall surface of the outer conductor 14 and the exterior surface of the central conductor 16.

The fluid level sensing assembly 10 includes a time domain retlectometry (TDR) circuit 26 having one terminal connected to an upper end 28 of the central conductor 16 and another terminal connected to a ground plane 30 in electrical contact with an upper end 32 of the tube 14. A liquid level gauge 34 is connected to an output of the TDR circuit 26. In operation, the TDR circuit 26 generates an ultra-short pulse along the central conductor 16. The tube 14 and the central conductor 16 form a transmission line such that the pulse travels down the line in the direction of an arrow 36 which pulse is known as the incident pulse having a voltage magnitude $V_i$. At the surface level 20 of the liquid, the incident pulse encounters a boundary between the air 22 above and the liquid 12 below the surface level. This boundary causes a portion of the incident pulse to be reflected back up the line in the direction of an arrow 38 as a reflected pulse having a voltage magnitude $V_r$. The remaining portion of the incident pulse travels through the liquid 12 toward the lower ends 18 and 24 of the transmission line in the direction of an arrow 40 as a forward scattered pulse having a voltage magnitude $V_f$.

Figure 2A:
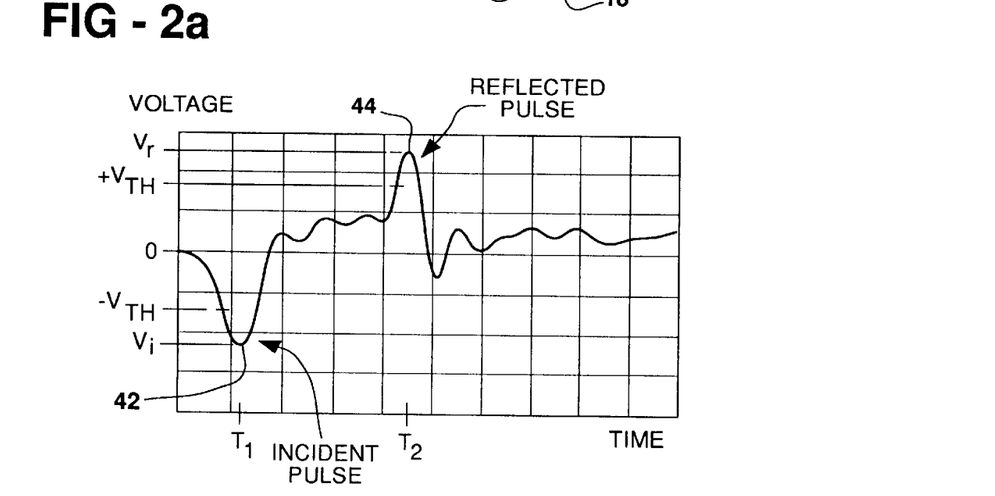
FIGS. 2a and 2b are waveform diagrams of the level sensing signals generated by the fluid level sensing apparatus shown in the FIG. 1.
Figure 2B:
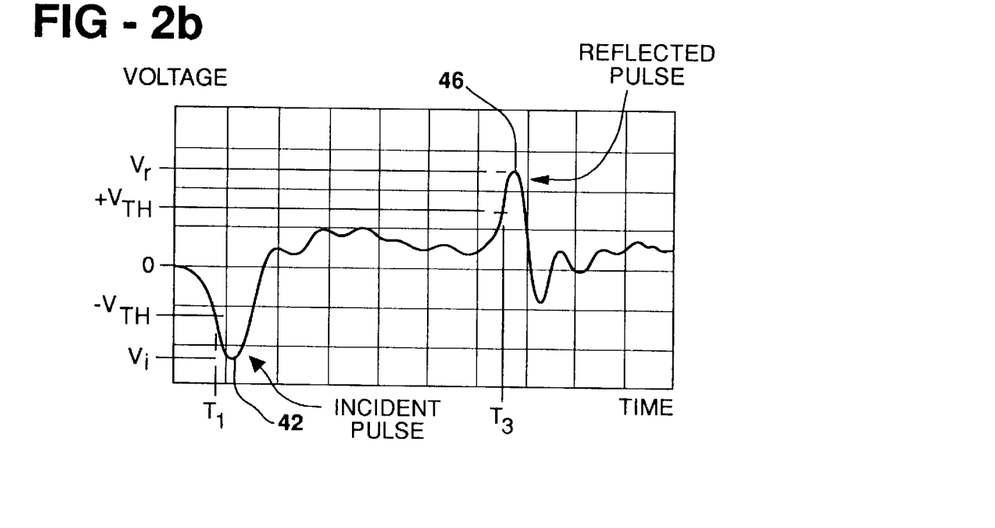

There is shown in the FIG. 2a a signal magnitude voltage versus time waveform diagram of the incident pulse and reflected pulse signals generated from and back to the TDR circuit 26. An incident pulse 42 is generated with the incident pulse voltage magnitude $V_i$ at the plane 30 at an incident pulse generation time $T_1$. The incident pulse 42 travels down the transmission line 14 and 16, but the plane 30 also generates a reflection as a fiducial pulse to the TDR circuit 26. Thus, the fiducial pulse generated at the time $T_1$ can be used by the TDR circuit 26 as a reference to determine the elapsed time to receipt of a reflected pulse. If the liquid surface 20 is relatively high in the tank, a first reflected pulse 44 arrives at the plane 30 at a time $T_2$. The difference between the generation time $T_1$ and the arrival time $T_2$ permits the calculation of the distance from the plane 30 to the surface level 20. Use of this time difference eliminates timing errors and drift in the TDR circuit 26. There is shown in the FIG. 2b a second reflected pulse 46 at a time $T_3$ representing an arrival time for a reflected pulse from a relatively low liquid level such that tile difference between the time $T_1$ and the time $T_3$ can be used to calculate the distance from the ground plane 30 to the surface level 20.

The use of the fiducial pulse generated at the time T1 to determine the elapsed time to receipt of a reflected pulse can be eliminated if the time between the pulse generation by the TDR circuit 26 and the arrival of the incident pulse at the top of the probe is known and remains constant.

Figure 3:
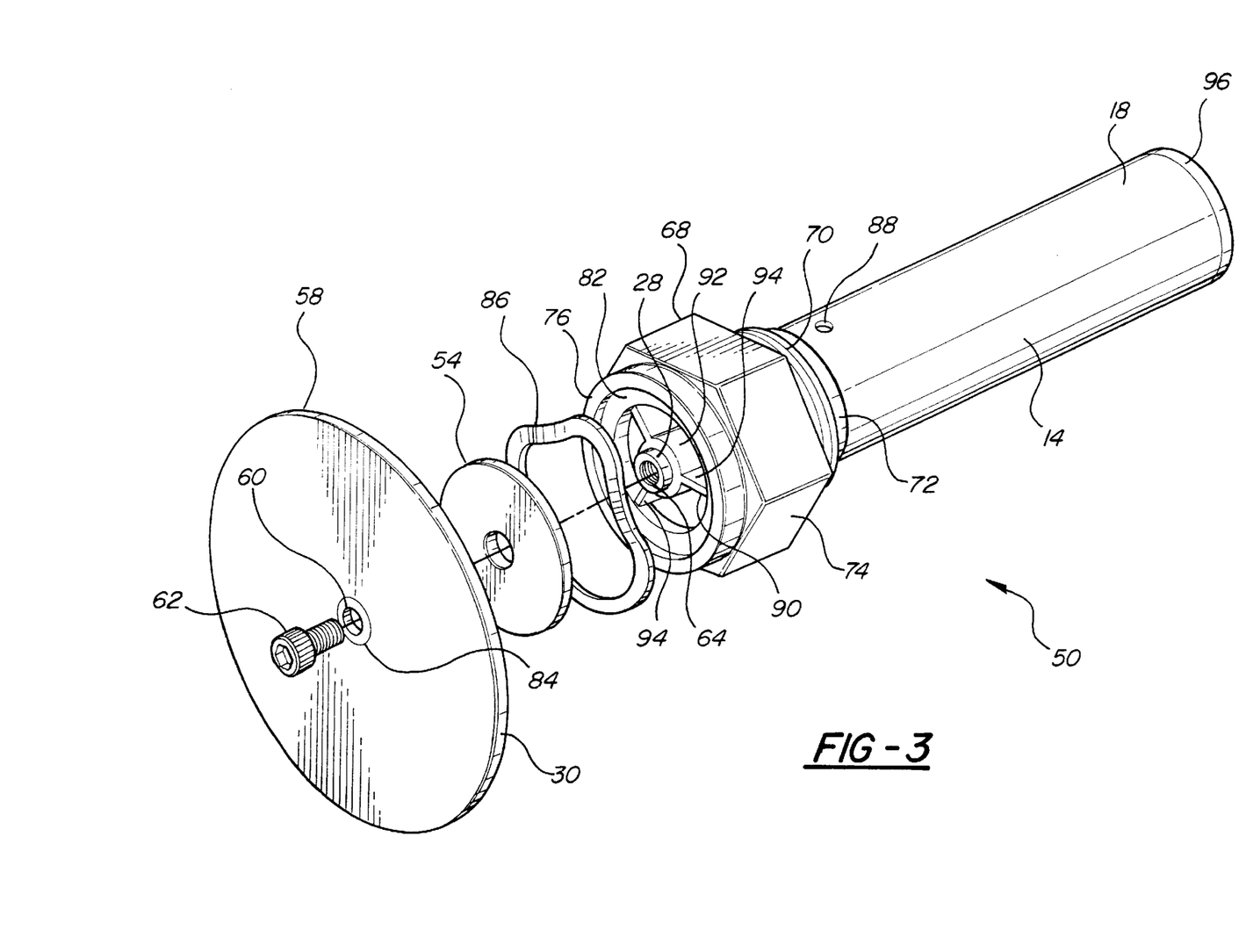
FIG. 3 is an exploded perspective view of a first embodiment of the probe assembly shown in the FIG. 1.
Figure 4:
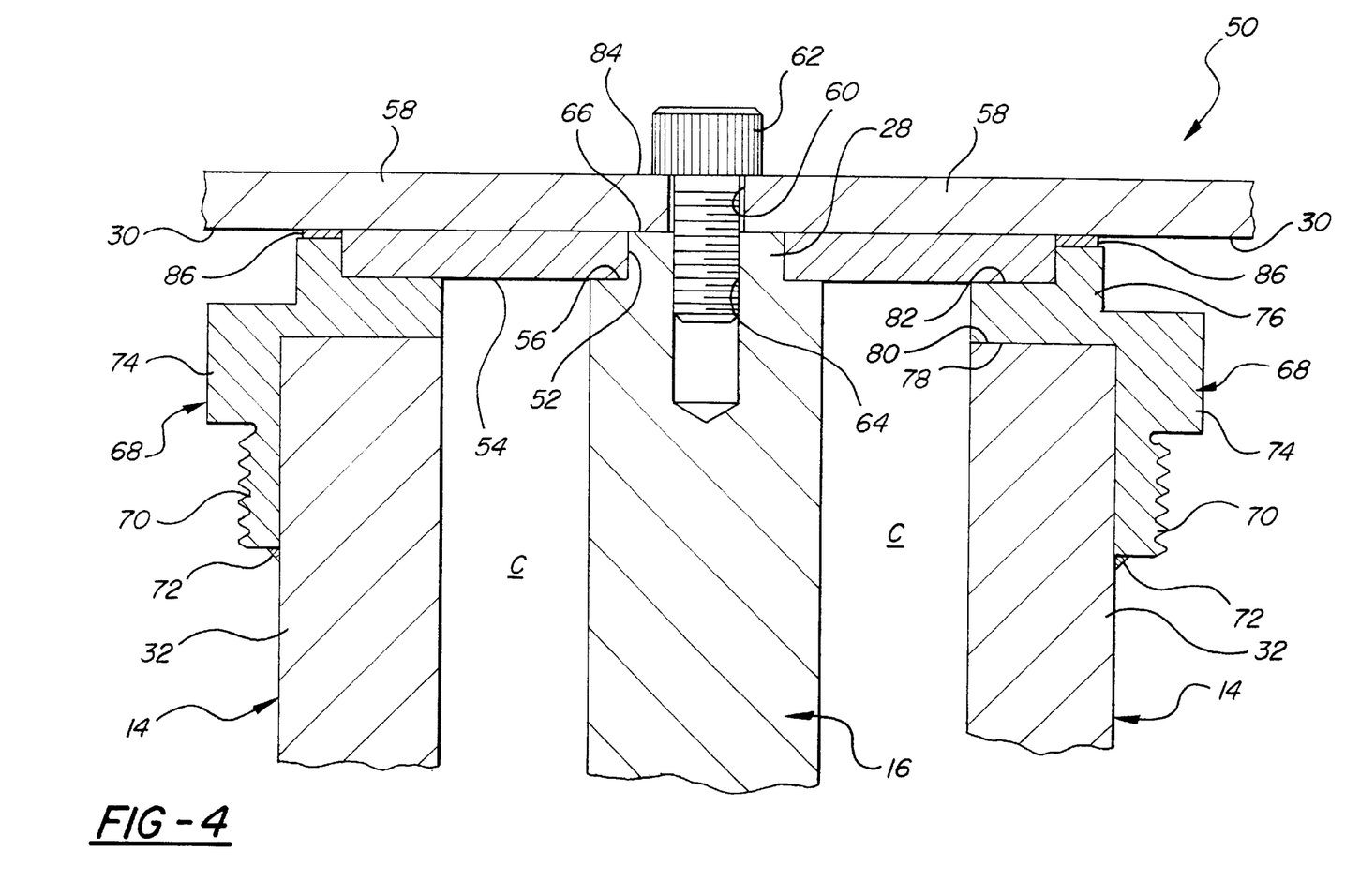
FIG. 4 is an enlarged fragmentary cross-sectional view of the probe assembly shown in the FIG. 3.

There is shown in the FIG. 3 and the FIG. 4 a probe assembly 50 for use in the fluid level sensing assembly 10. The probe assembly 50 includes the hollow tube outer conductor 14 and the central conductor 16 formed as a solid rod. The upper end 28 of the central conductor 16 is reduced in diameter and extends into a central aperture 52 formed in a sealing washer 54 which can be made of a rubber material or similar material capable of maintaining a fluid seal at the upper end of the cavity C. The reduced diameter upper end 28 forms a step or flange 56 upon which a portion of a lower surface of the seal 54 rests. A printed circuit board 58 rests on top of the sealing washer 54 and has a central aperture 60 formed therein. The circuit board 58 can be used to mount the components of the TDR circuit 26. A threaded fastener 62 extends through the aperture 60 and threadably engages a threaded aperture 64 formed in an upper surface 66 of the upper end 28 of the central conductor 16. Thus, the threaded fastener 62 draws the circuit board 58 against the tipper end surface 66 of the central conductor 16 and compresses the sealing washer 54 between a lower surface of the printed circuit board and the flange 56.

A socket 68 couples the tube 14 with the central conductor 16 to seal the cavity inside the tube from the printed circuit board 58. The socket 68 is formed with an annular lower portion 70 which is externally threaded and internally receives the upper end 32 of the tube 14. The lower portion 70 and the tube 14 can be attached together by any suitable means such as by welding, brazing or any other known method of metallically bonding 72 the two parts together. A central portion 74 of the socket 68 is of enlarged diameter and has a hexagonal cross-section for accepting a wrench to permit the probe assembly 50 to be threaded into a threaded aperture (not shown) in a flange or other suitable mounting bracket in order to maintain the probe assembly 50 in the desired position relative to the liquid 12. An upper portion 76 of the socket 68 abuts an outer periphery of the sealing washer 54. The central portion 74 extends inwardly to form a downwardly facing flange 78 which abuts an upper end face 80 of the tube 14. Similarly, the upper portion 76 extends inwardly to form an upwardly facing flange 82 which abuts the lower face of the sealing washer 54. Thus, the sealing washer 54 is compressed between the lower surface of the circuit board 58 and the flange 82 to provide a fluid seal preventing fluid in the tube 14 from escaping.

A metallic pad 84 surrounds the aperture 60 on an upper surface of the printed circuit board 58. The pad 84 functions as one of the terminals of the TDR circuit 26 and is electrically connected to the central conductor 16 by the fastener 62. A metallic washer 86 is provided between the lower surface of the printed circuit board 58 and the upper end surface of the portion 74 of the socket 68. The metallic washer 86 can be in the form of a wave washer, as shown, or can be a wire mesh gasket. The washer 86 abuts the ground plane 30 which is formed on the lower surface of the printed circuit board 58 to provide an electrical connection with the tube 14 through the metallic socket 68. The washer 86 is compressed as the fastener 62 is tightened and maintains a fluid seal which can be approximately 15 psi.

A dampening hole 88 is provided in the wall of the tube 14 near the upper end 32 to allow air to escape from the cavity C between the central conductor 16 and the tube as the surface level 20 rises. The hole 88 is sized to regulate the flow of air therethrough thereby regulating the rate of change in the height of the fluid 12 in the cavity. In order to maintain uniform spacing between the interior wall surface of tile tube 14 and the exterior surface of the central conductor 16, a spacer 90 is provided having a tubular central body 92 for receiving the central conductor 16 and a plurality of radially extending legs 94 which contact the inner wall surface of the tube 14. The spacer 90 is formed of a non-metallic material such as a plastic material. The central body 92 can be longitudinally slotted for a snap fit on the central conductor 16.

As discussed below in connection with the alternate embodiments, the central conductor 16 can have a threaded lower end (not shown) which engages a threaded central aperture (not shown) formed in a non-metallic (e.g., nylon) end cap 96. The end cap 96 has a stepped periphery (not shown) to engage the end surface of the lower end 18 thereby closing the tube 14 as the end cap is threaded onto the central conductor 16. A plurality of apertures (not shown) are formed in the end cap 96 to permit the fluid to flow into and out of the tube 14. The end cap 96 is threaded onto the lower end of the central conductor 16 to draw the circuit board 58 toward the tube 14 and compress the washers 54 and 86.

During transmission of the electrical signal from the TDR circuit 26 on the circuit board 58, the correct impedance must be maintained. The general impedance formula for coaxial transmission lines is $Z_0 = (138/\sqrt{(\mathscr{E})}) \cdot \log(B/A)$, where "$Z_0$" is the impedance in Ohms, "$\mathscr{E}$" is the relative permitivity of the dielectric material, "B" is the inner diameter of the outer conductor 14 and "A" is the outer diameter of the central conductor 16. Since several different dielectric materials, having dissimilar relative permitivities, are used is forming the transmission line, the inner diameter "B" and the outer diameter "A" must change to maintain the correct impedance along the signal path. For example, the outer diameter of the upper end 28 of the central conductor 16 and the inner diameter of the upper portion 76 of the socket 68 are selected in coordination with the dielectric of the sealing washer 54 to correctly maintain the electrical impedance at a value corresponding to the cavity portion of the transmission line.

Figure 5:
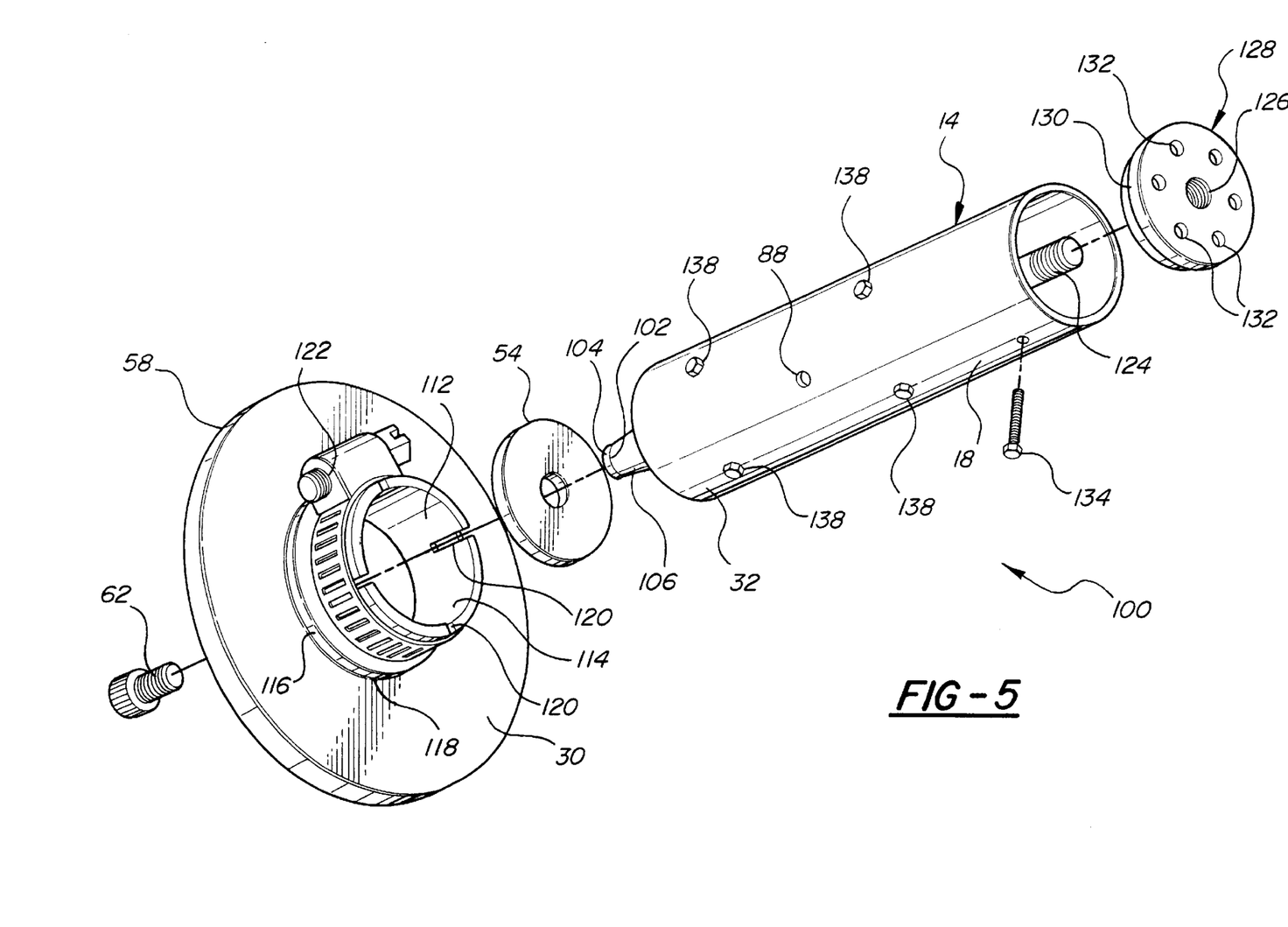
FIG. 5 is an exploded perspective view of a second embodiment of the probe assembly shown in the FIG. 1.
Figure 6:
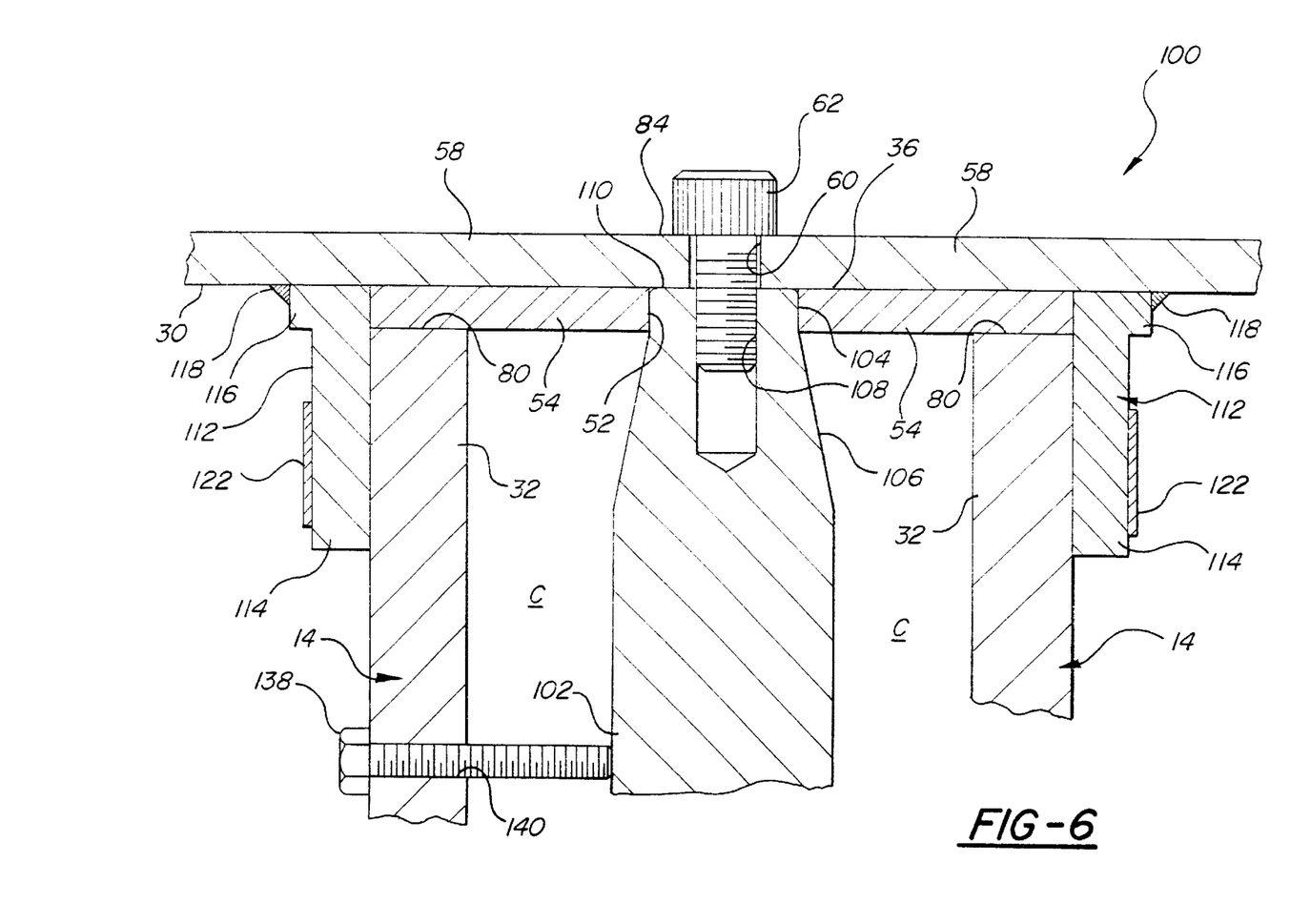
FIG. 6 is an enlarged fragmentary cross-sectional view of the probe assembly shown in the FIG. 5.

There is shown in the FIG. 5 and the FIG. 6 an alternate embodiment probe assembly 100 for use in the fluid level sensing assembly 10 when the impedance at the circuit board 58 and the impedance of the transmission line can be slightly different. The probe assembly 100 includes a transmission line formed by the hollow tube outer conductor 14 and a tapered central conductor 102 shown as a solid rod. An upper end 104 of the central conductor 102 is reduced in diameter and extends into the central aperture 52 formed in the sealing washer 54. The reduced diameter upper end 104 is connected to the larger diameter lower end of the central conductor 102 by a tapered section 106. The printed circuit board 58 rests on top of the sealing washer 54 with the threaded fastener 62 extending through the aperture 60 and threadably engaging a threaded aperture 108 formed in an upper surface 110 of the upper end 104 of the central conductor 102. Thus, the threaded fastener 62 draws tile circuit board 58 against the upper end surface 110 of the central conductor 102 and compresses the sealing washer 54 between a lower surface of the circuit board and the tapered section 106.

A collar 112 couples the tube 14 with the central conductor 102 to seal the cavity C inside the tube from the printed circuit board 58. The collar 112 can be formed of a brass material and has as an annular wall portion 114 which internally receives the upper end 32 of the tube 14. The wall 114 has a radially outwardly extending flange 116 formed at an tipper end there which flange abuts the lower surface of the circuit board 58. The flange 116 can be attached to the ground plane 30 on the lower surface of the circuit board 58 by any suitable means such as by soldering 118. A plurality of longitudinally extending slots 120 are formed in the wall portion 114 and extend from a bottom edge of the wall terminating adjacent to the flange 116. The sealing washer 54 is retained between the lower surface of the circuit board 58 and the upper end face 80 of the tube 14. A hose clamp 122 extends about the exterior of the wall portion 114 and can be tightened to inwardly compress the sections of the wall between the slots 120 to firmly retain the upper end 32 of the tube 14. Thus, the sealing washer 54 is compressed between the lower surface of the circuit board 58 and the upper end face 80 to provide a fluid seal preventing fluid in the tube 14 from escaping.

The central conductor 102 has a threaded lower end 124 which engages a threaded central aperture 126 formed in a non-metallic (e.g., nylon) end cap 128. The end cap 128 has a stepped periphery 130 to engage the end surface of the lower end 18 thereby closing the tube 14 as the end cap is threaded onto the central conductor 102. A plurality of apertures 132 are formed in the end cap 128 to permit the fluid to flow into and out of the tube 14. The end cap 128 is threaded onto the lower end 124 to draw the circuit board 58 toward the tube 14 before the clamp 122 is tightened. The end cap 128 can be locked in place by engaging the periphery 130 with a non-metallic (e.g., nylon) set screw 134 threadably engaged in a radially extending threaded aperture 136 formed in the wall of the lower end 18 of the tube 14. The central conductor 102 can be maintained at the longitudinal axis of the tube 14 by a plurality of centering screws 138 thread(ed through threaded apertures 140 formed in the wall of the tube 14 and in engagement with the central conductor. Typically, three of the screws 138 are located in a centering plane perpendicular to the longitudinal axis of the tube 14 and are equally spaced about the periphery of the tube. The number of centering planes will depend upon the length of the transmission line.

Figure 7:
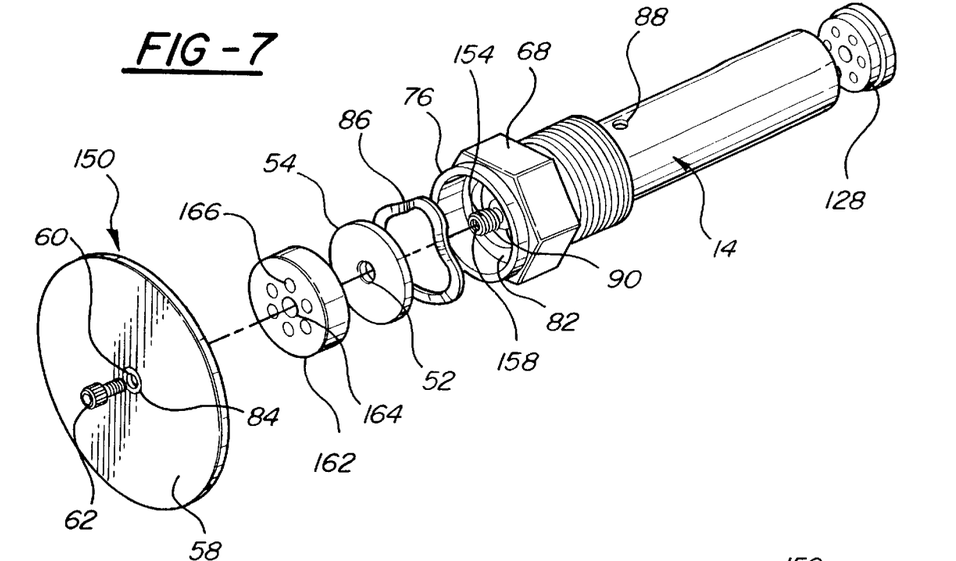
FIG. 7 is an exploded perspective view from an upper end of a third embodiment of the probe assembly shown in the FIG. 1.
Figure 8:
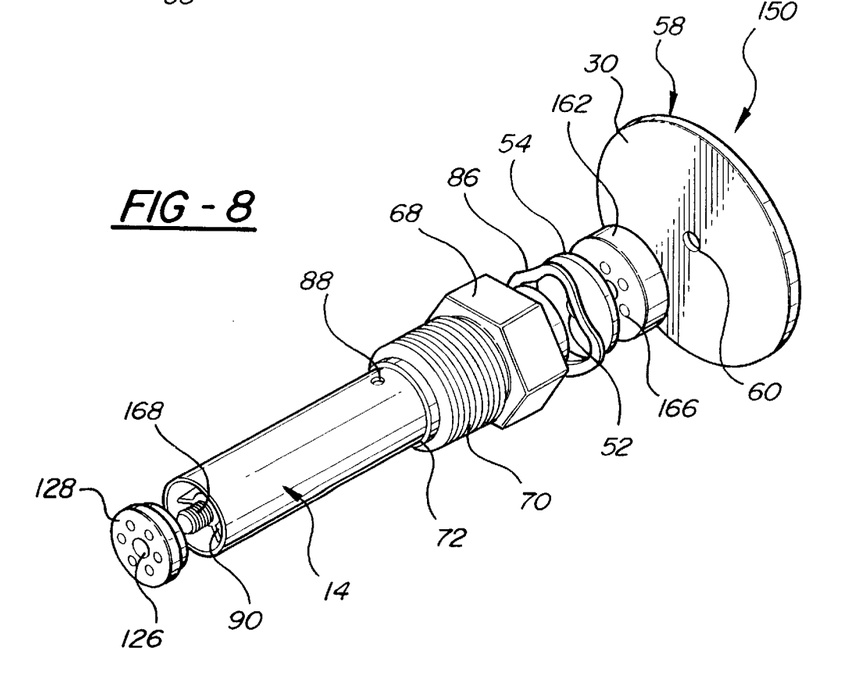
FIG. 8 is an exploded perspective view from a lower end of the probe assembly shown in the FIG. 7.
Figure 9:
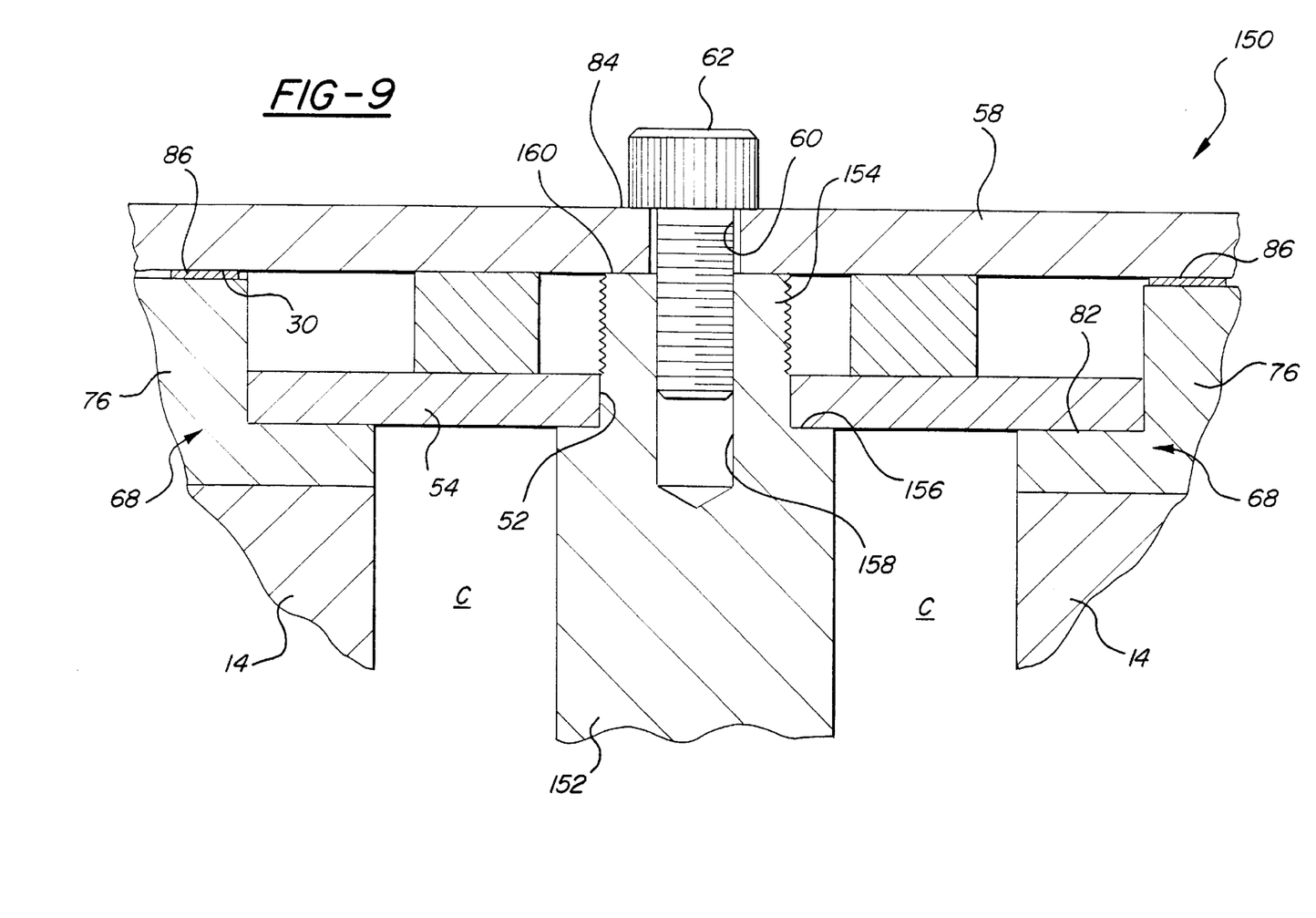
FIG. 9 is an enlarged fragmentary cross-sectional view of the probe assembly shown in the FIG. 7 and the FIG. 8.

There is shown in the FIG. 7, the FIG. 8 and the FIG. 9 a second alternate embodiment probe assembly 150 for use in the fluid level sensing assembly 10. The probe assembly 150 includes the hollow tube outer conductor 14 and a central conductor 152 formed as a solid rod and is similar in design to the probe assembly 50. An upper end 154 of the central conductor 152 is reduced in diameter and extends into the central aperture 52 formed in the scaling washer 54. The reduced diameter upper end 154 forms a step or flange 156 upon which a portion of a lower surface of the seal 54 rests. The printed circuit board 58 rests on top of the sealing washer 54 and the threaded fastener 62 extends through the aperture 60 and threadably engages a threaded aperture 158 formed in an upper surface 160 of the upper end 154 of the central conductor 152.

The socket 68 couples the tube 14 with the central conductor 152 to seal the cavity inside the tube from the printed circuit board 58 as previously described. The upper portion 76 of the socket 68 retains the sealing washer 54 and a non-metallic (e.g., plastic) cylindrical seal retainer 162. The seal retainer 162 has a central aperture 164 formed therein for threadably engaging external threads formed on the upper end 154 of the central conductor 152. The aperture 164 can be formed with threads or threaded by rotating the retainer 162 onto the threaded end 154. Thus, the sealing washer 54 is compressed between the lower surface of the seal retainer 162 and upwardly facing surfaces of the flanges 82 and 156 to provide fluid seal preventing fluid in the tube 14 from escaping. Now, only the metallic washer 86 is compressed as the fastener 62 is tightened. The seal retainer 162 also has a plurality of apertures 166 formed therein spaced about the central aperture 164. The number and size of the apertures 166 will vary depending upon the impedance matching required. The end cap 128 is used to attach the tube 14 to the central conductor 152. A lower end 168 of the central conductor 152 is threaded to engage the aperture 126 in the end cap 128.

Figures 10A, 10B:
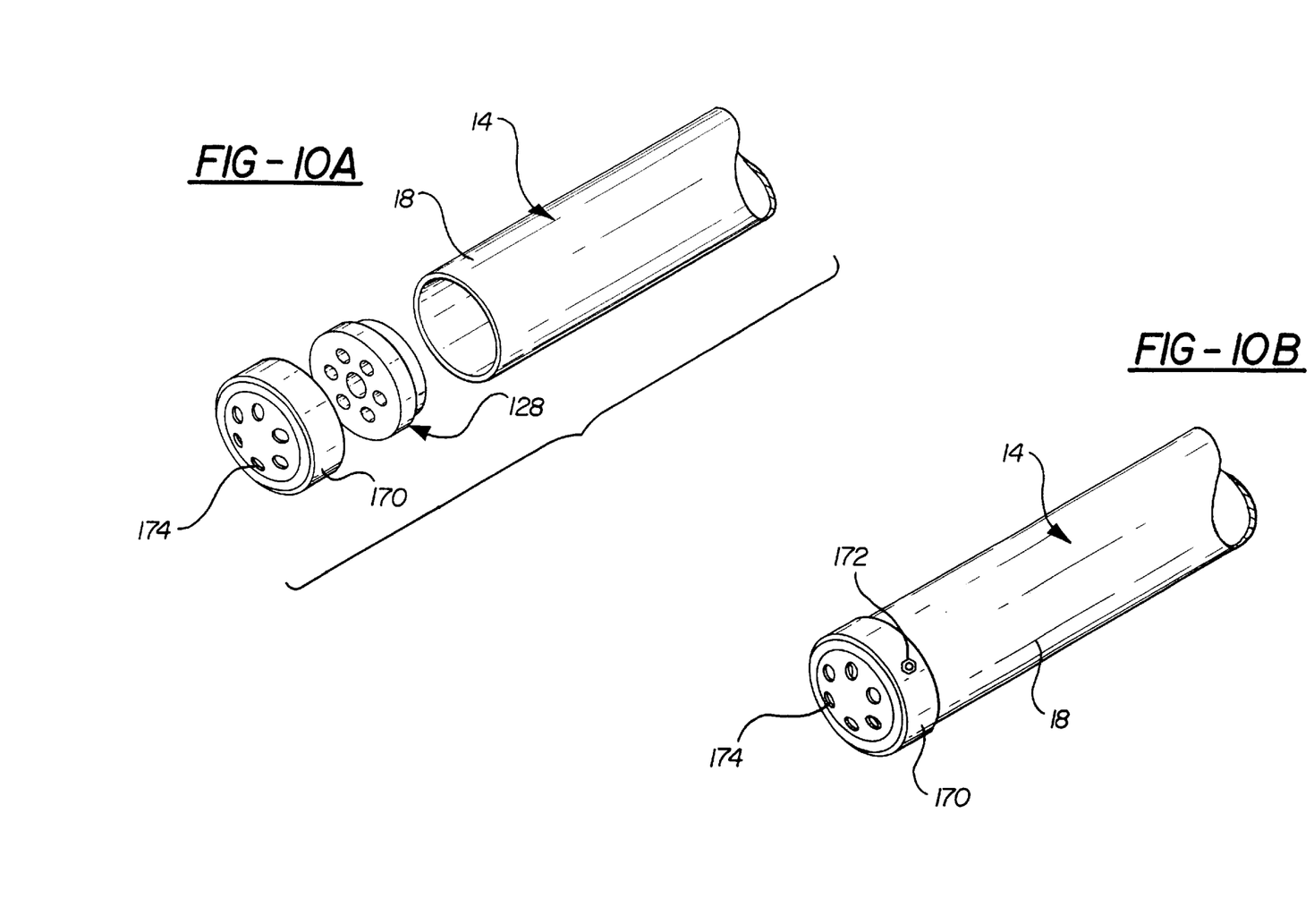
FIGS. 10a and 10b are an exploded view and an assembled view respectively of an alternate embodiment of the lower end of tile outer conductor shown in the FIG. 8.

There is shown in the FIGS. 10a and 10b an alternate embodiment of the end cap 128 at the lower end 18 of the tube 14. A generally cup-shaped end cover 170 is sized to fit over the end cap 128. The end cover 170 is attached to tile tube 14 by any suitable means such as by peeking at a plurality of locations 172 about a peripheral wall of the end cover. A plurality of apertures 174 are formed in the end cover 170 to permit the fluid to flow into and out of the tube 14. The end cover 170 is formed of a metallic material to shield the probe from strong external signals from radio frequency interference (RFI) sources.

In summary, the apparatus 50, 100, 150 for use in sensing fluid levels includes: the generally cylindrical central conductor 16, 102, 152 adapted to be connected to the pulse signal source 26 and having the reduced diameter end 28, 104, 154 and the opposite end 24, 124, 168; the generally tubular outer conductor 14 concentric with the central conductor 16, 102, 152 and adapted to be connected to the pulse signal source 26, the outer conductor having the one open end 32 adjacent the central conductor reduced diameter end 28, 104, 154 and the opposite open end 18 adjacent the central conductor opposite end 24, 124, 168, the central conductor and the outer conductor forming a transmission line for pulse signals generated by the pulse signal source and a cavity C between an interior wall surface of the outer conductor and the exterior surface of the central conductor; the non-metallic sealing means 54 mouoted at the one open end 32 of tile outer conductor 14 for sealing the cavity C, the central conductor reduced diameter end 28, 104, 154 extending through the central aperture 52 formed in the sealing means; the circuit board 58 adapted to mount the pulse signal source 26 and being electrically connected to the central conductor reduced diameter end 28, 104, 154 and to the outer conductor one open end 32; and the seal retaining means 68, 112 attached to one of the outer conductor one open end 32 and the circuit board 58 for maintaining the sealing means 54 in sealing contact with the outer conductor one open end and the central conductor reduced diameter end 28, 104, 154 to prevent fluid 12 in the cavity C from contacting the circuit board.

The circuit board 58 includes the signal pad 84 electrically connected to the central conductor reduced diameter end 28, 104, 154 and the ground plane 30 electrically connected to the outer conductor one open end 32. The metallic washer 86 is positioned between and in electrical contact with the ground plane 30 and the outer conductor one open end 32. The circuit board 58 has the central aperture 60 formed therein and the central conductor reduce(d diameter end 28, 104, 154 has the threaded aperture 64, 108, 158 formed therein and the threaded fastener 62 extends through the central aperture and threadably engages the threaded aperture and is in electrical contact with the signal pad 84 and the central conductor 16, 102, 152.

The non-metallic spacer means 90, 138 is positioned in the cavity C and abuts the outer conductor 14 and the central conductor 16, 102, 152 for maintaining the conductors substantially concentric. The spacer means 90 includes the generally tubular central body 92 for receiving the central conductor 16, 152 and the plurality of generally radially extending legs 94 abutting the inner wall surface of the outer conductor 14. The spacer means 138 includes the plurality of centering screws extending through a wall of the outer conductor 14 and abutting tile central conductor 102.

The seal retaining means 68 is a socket attached to the outer conductor one open end 32 and having the extemally threaded lower portion 70 adapted to threadably engage a threaded aperture in a device for mounting the probe apparatus 50, 150. The seal retaining means 112 includes a collar attached to the circuit board 58 and having the slotted annular wall 114 adapted to receive the outer conductor one open end 32 and the clamping means 122 extending about the wall for inwardly compressing the wall to firmly retain the outer conductor 14.

The central conductor opposite end 24, 124, 168 is threaded and the end cap 96, 128 has the central aperture 126 formed therein for engaging the threaded opposite end and closing the outer conductor opposite open end 18. The end cap 96, 128 has the plurality of apertures 132 formed therein to permit the fluid 12 to flow into and out of the cavity C. The non-metallic set screw 134 threadably engages the radially extending threaded aperture 136 formed in a wall of the outer conductor opposite open end 18 and contacts the periphery 130 of the end cap 128 to retain the end cap.

The dampening hole 88 is formed in a wall of the outer conductor 14 adjacent the one open end 32 to allow air to escape from the cavity C as the surface level 20 of the fluid 12 rises. The seal retaining means 68 includes the non-metallic seal retainer 162 positioned between the sealing means 54 and the circuit board 58 and having the central aperture 164 formed therein for engaging external threads formed on the central conductor reduced diameter end 154. The plurality of apertures 166 are formed in the seal retainer 162 and spaced about the central aperture 164.

The invention has been described in an illustrative mannner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An apparatus (50, 100, 150) for use in sensing fluid levels comprising:
    a generally cylindrical central conductor (16, 102, 152) electrically coupled with a pulse signal source (26) and having a reduced diameter end (28, 104, 154) and an opposite end (24, 124, 168);
    a generally tubular outer conductor (14) concentric with said central conductor (16, 102, 152) and electrically coupled to the pulse signal source (26), said outer conductor having one open end (32) adjacent said central conductor reduced diameter end (28, 104, 154) and an opposite open end (18) adjacent said central conductor opposite end (24, 124, 168), said central conductor and said outer conductor forming a transmission line for pulse signals generated by the pulse signal source and a cavity (C) between an interior wall surface of said outer conductor and an exterior surface of said central conductor;
    a non-metallic seal (54) mounted at said one open end (32) of said outer conductor (14) for sealing said cavity (C), said central conductor reduced diameter end (28, 104, 154) extending through a central aperture (52) formed in said seal;
    a circuit board (58) supporting said pulse signal source (26) and directly contacting said central conductor reduced diameter end (28, 104, 154) and electrically coupling the pulse signal source to said central conductor and said outer conductor one open end (32); and
    a seal retainer (68, 112) attached to one of said outer conductor one open end (32) and said circuit board (58) that maintains said seal (54) in sealing contact with said outer conductor one open end and said central conductor reduced diameter end (28, 104, 154) to prevent fluid (12) in said cavity (C) from contacting said circuit board.

2. The apparatus according to claim 1 wherein said circuit board (58) includes a signal pad (84) electrically connected to said central conductor reduced diameter end (28, 104, 154) and a ground plane (30) electrically connected to said outer conductor one open end (32).

3. The apparatus according to claim 2 including a metallic washer (86) positioned between and in electrical contact with said ground plane (30) and said outer conductor one open end (32).

4. The apparatus according to claim 2 wherein said circuit board (58) has a central aperture (60) formed therein and said central conductor reduced diameter end (28, 104, 154) has a threaded aperture (64, 108, 158) formed therein and including a threaded fastener (62) extending through said central aperture and threadably engaging said threaded aperture and being in electrical contact with said signal pad (84) and said central conductor (16, 102, 152).

5. The apparatus according to claim 1 including a non-metallic spacer (90, 138) positioned in said cavity (C) and abutting said outer conductor (14) and said central conductor (16, 102, 152) for maintaining said conductors substantially concentric.

6. The apparatus according to claim 5 wherein said spacer (90) includes a generally tubular central body (92) for receiving said central conductor (16, 152) and a plurality of generally radially extending legs (94) abutting said inner wall surface of said outer conductor (14).

7. The apparatus according to claim 5 wherein said spacer (138) includes a plurality of centering screws extending through a wall of said outer conductor (14) and abutting said central conductor (102).

8. The apparatus according to claim 1 wherein said seal retainer (68) is a socket attached to said outer conductor one open end (32) and having an externally threaded lower portion (70) adapted to threadably engage a threaded aperture in a device for mounting the probe apparatus (50, 150).

9. The apparatus according to claim 1 wherein said seal retainer (112) includes a collar attached to said circuit board (58) and having a slotted annular wall (114) adapted to receive said outer conductor one open end (32) and a clamp (122) extending about said wall for inwardly compressing said wall to firmly retain said outer conductor (14).

10. The apparatus according to claim 1 wherein said central conductor opposite end (24, 124, 168) is threaded and including an end cap (96, 128) having a central aperture (126) formed therein for engaging said threaded opposite end and closing said outer conductor opposite open end (18).

11. The apparatus according to claim 10 wherein said end cap (96, 128) has a plurality of apertures (132) formed therein to permit the fluid (12) to flow into and out of the cavity (C).

12. The apparatus according to claim 10 including a non-metallic set screw (134) threadably engaged in a radially extending threaded aperture (136) formed in a wall of said outer conductor opposite open end (18) and contacting a periphery (130) of said end cap (128) to retain said end cap.

13. The apparatus according to claim 1 including a dampening hole (88) formed in a wall of said outer conductor (14) adjacent said one open end (32) to allow air to escape from said cavity (C) as a surface level (20) of the fluid (12) rises.

14. The apparatus according to claim 10 including a generally cup-shaped end cover (170) formed of a metallic material and having a plurality of apertures (174) formed therein to permit the fluid (12) to flow into and out of the cavity (C), said end cover enclosing said end cap (128) and being attached to said outer conductor (14).

15. The apparatus according to claim 1 wherein said seal retainer (68) includes a non-metallic seal retainer (162) positioned between said seal (54) and said circuit board (58) and having a central aperture (164) formed therein for engaging external threads formed on said central conductor reduced diameter end (154).

16. The apparatus according to claim 15 including a plurality of apertures (166) formed in said seal retainer (162) and spaced about said central aperture (164).

17. A probe apparatus (50, 150) for use in sensing fluid levels comprising:

a generally cylindrical central conductor (16, 152) electrically coupled with a pulse signal source (26) and having a reduced diameter end (28, 154) and an opposite end (24, 168);

a generally tubular outer conductor (14) concentric with said central conductor (16, 152) and electrically coupled to the pulse signal source (26), said outer conductor having one open end (32) adjacent said central conductor reduced diameter end (28, 154) and an opposite open end (18) adjacent said central conductor opposite end (24, 168), said central conductor and said outer conductor forming a transmission line for pulse signals generated by the pulse signal source and a cavity (C) between an interior wall surface of said outer conductor and an exterior surface of said central conductor;

a seal (54) mounted at said one open end (32) of said outer conductor (14) for sealing said cavity (C), said central conductor reduced diameter end (28, 154) extending through a central aperture (52) formed in said seal;

a circuit board (58) supporting the pulse signal source (26) and coupling the pulse signal source to the central and outer conductors, said circuit board having a signal pad (84) directly contacting and electrically connected to said central conductor reduced diameter end (28, 154), said circuit board having a ground plane (30) electrically connected to said outer conductor one open end (32); and a socket (68) attached to said outer conductor one open end (32) for maintaining said seal (54) in sealing contact with said outer conductor one open end and said central conductor reduced diameter end (28, 154) to prevent fluid in said cavity (C) from contacting said circuit board (58).

18. A probe apparatus (100) for use in sensing fluid levels comprising:

a generally cylindrical central conductor (102) electrically coupled to a pulse signal source (26) and having a reduced diameter end (104) and an opposite end (124);

a generally tubular outer conductor (14) concentric with said central conductor (102) and electrically coupled to the pulse signal source (26), said outer conductor having one open end (32) adjacent said central conductor reduced diameter end (104) and an opposite open end (18) adjacent said central conductor opposite end (124), said central conductor and said outer conductor forming a transmission line for pulse signals generated by the pulse signal source and a cavity (C) between an interior wall surface of said outer conductor and an exterior surface of said central conductor;

a seal member (54) mounted at said one open end (32) of said outer conductor (14) for sealing said cavity (C), said central conductor reduced diameter end (104) extending through a central aperture (52) formed in said sealing means;

a circuit board (58) supporting said pulse signal source (26) and directly contacting said central conductor reduced diameter end (104) and electrically coupling said pulse signal source to said central conductor and said outer conductor one open end (32); and a collar (112) attached to said circuit board (58) for maintaining said seal member (54) in sealing contact with said outer conductor one open end and said central conductor reduced diameter end (104) to prevent fluid in said cavity (C) from contacting said circuit board.

* * * * *